March 7, 1972  E. WOLF  3,647,590
METHOD OF BENDING PLATES
Filed Jan. 22, 1970

United States Patent Office 3,647,590
Patented Mar. 7, 1972

3,647,590
METHOD OF BENDING PLATES
Emanuel Wolf, Horgen, Switzerland, assignor to Swiss Aluminium Ltd., Chippis, Switzerland
Filed Jan. 22, 1970, Ser. No. 5,040
Claims priority, application Switzerland, Jan. 23, 1969, 947/69
Int. Cl. B31f 5/02
U.S. Cl. 156—211           11 Claims

ABSTRACT OF THE DISCLOSURE

A method of bending a composite plate composed of an inner core of synthetic material and an outer strip of a second different material, on at least one side thereof, provides for removing a portion of said cover strip near the region of bending, thereby creating a groove at the bending region in the core, and heating the groove; the groove creating and heating may be carried out by a wedge shaped heating sword. Thereafter the plate is bent about the groove until the faces of the groove fuse and the ends of the cover strip meet.

Reference is made to my related application Ser. No. 875,728, filed Nov. 12, 1969 and titled Composite Plate Welding.

BACKGROUND OF THE INVENTION

The invention relates to a method of bending composite plates composed of a thermoplastic synthetic material core and a cover strip composed of a second different material, namely a sheet material, disposed near at least one major surface of the core.

Problems have heretofore existed in the methods of bending the aforesaid composite plate. This problem is especially acute where the composite plates are used as structural elements for various purposes.

While it is known to heat the plates along a bending region, the bending radii are quite large and therefore acute angle creases cannot be produced in this manner.

It is also known to crease such thermoplastic composite plates in a manner so as to furnish a small bending radius; this is accomplished by pressing a sword shaped heating rod along the bending region, prior to the bending operation. The foregoing will furnish a groove having a V-shaped cross section, whereupon subsequent to creasing the groove walls will fuse together.

SUMMARY OF THE INVENTION

It is accordingly among the principal objects of the invention to obviate the aforedescribed drawbacks of the prior art.

It is a further object of the invention to provide an improved method of bending composite thermoplastic core plates.

It is another object of the invention to provide such a method which is economical, efficient and expedient.

It is still another object of the invention to provide a method of bending such composite plates by removing at least a portion of the outer cover strip near the bending region, so as to provide for exact bending to produce an acute angle at the bend.

The method of bending composite plates in accordance with the present invention broadly is characterized in that a part of the cover strip sheet is first removed from the inner side of the core along the desired bending region thereby creating a gap, a groove which preferably has a V-shaped cross section is then recessed in the core at the gap by removal of at least some portion of the core, and the groove is subjected to heating. The creation and heating of the groove is preferably carried out by means of a wedge shaped heating sword. The bending operation is then carried out. The width of the part of the cover sheet strip which is detached prior thereto preferably is computed in such a manner that, during the ensuing bending operation, the opposite faces of the groove will abut and fuse while the forced out wad of synthetic material becomes sheared off.

This method makes it possible to bend composite plates having a slight bending radii, while also assuring that the remaining synthetic material core is completely covered over by the cover strip.

The composite plates preferably are composed of a polyolefine core, for example, polyethylene or polypropylene having a thickness of from 1 to 8 mm., and one or more cover sheet strips having a thickness of from 1 to 2 mm. The thickness of the core is selected in such a fashion that in a preferred embodiment it will be a multiple of the thickness of the strip. The strips are composed of a second and different material such as metal, for instance aluminum or an aluminum alloy. The strips are bonded to the core by known suitable means.

The cover strip which is to be detached at the bending region can be easily separated from the core, for example, by making an incision by means of a revolving cutter or by another suitable cutting tool, and by subsequently pealing off the strip. The width of the strip to be separated will depend on the thickness of the composite plate and of the bending angle. For rectangular bending, this width will amount to approximately one and one-half times the thickness of the composite plate. The depth of the groove to be impressed will depend on the desired magnitude of the bending angle, and amounts to about two-thirds of the core thickness.

With the above and other objects of the invention in view, the invention consists in the novel methods as set forth in the claims hereof, certain embodiments of the same being illustrated in the accompanying drawings and described in the specification.

In the accompanying drawings.

Figure 1:
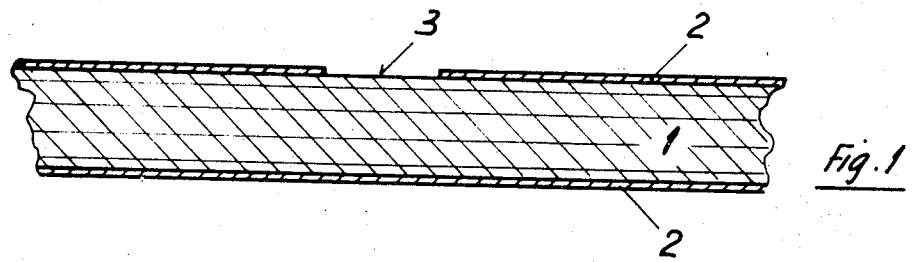
FIG. 1 is a fragmentary sectional view through a multi-layered composite plate at an initial pre-bending stage.
Figure 2:
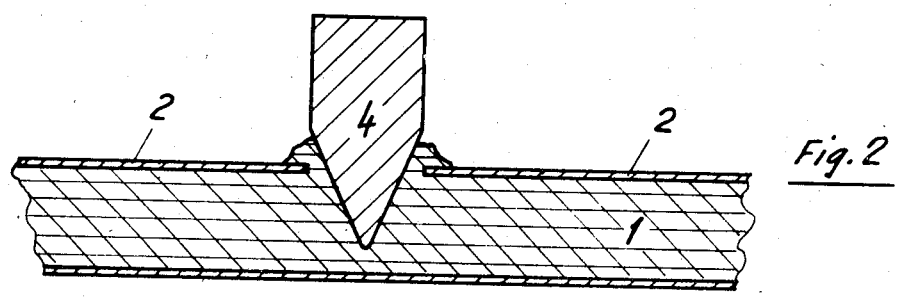
FIG. 2 is a sectional view similar to FIG. 1 but at a later stage of bending.
Figure 3:
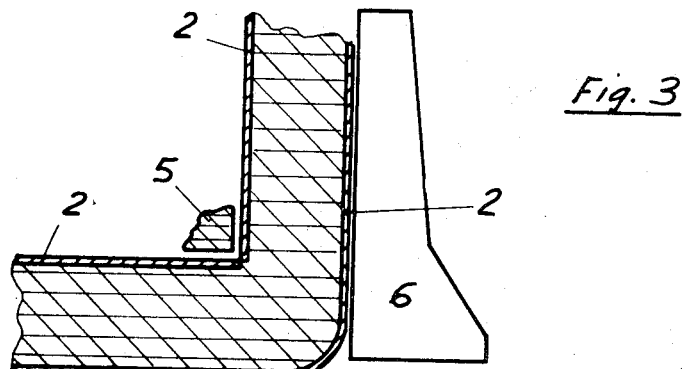
FIG. 3 is a sectional view similar to FIG. 1 but at a terminal stage of bending.

In carrying the invention into effect in the embodiments which have been selected for illustration in the accompanying drawings and for description in this specification, and referring now particularly to FIGS. 1–3, the composite plate which is to be bent is composed of a core layer 1 and at least one cover sheet strip 2.

In a preferred embodiment, the core layer 1 will, for example, be composed of a 6 mm. thick polyethylene whereas the cover sheet strip 2 will be 1.5 mm. thick and be composed of a different material, such as pure aluminum.

Initially, a part of the cover sheet strip 2 is removed near the desired bending region 3. In this exemplification the width of the removed part is 13.5 mm. wide.

A sword-shaped heating rod 4 is pressed into and along the exposed area of the core layer; namely along the bending region 3, whereupon it displaces at least some of the core material 1 causing it to be deposited, outside the cover strip portion 3. The operating temperature of the heating rod 4 ranges from about 180° C. to about 230° C. After a sufficiently long heating period, which can vary from about 10 to about 80 seconds, the heating sword 4 is removed and the composite plate is bent, for instance, in a bending device that includes clamping bars 6 and 7

(FIG. 3). The remainder of the bending device, which is of conventional construction has been omitted from the drawing so as not to obstruct the view.

In order to ensure that the heating process during the impressing of the groove does not extend over too long a time period and thereby cause decomposition of the synthetic material, the groove can also preliminarily be roughed out by mechanical means.

Subsequent to the bending, the edges of the groove in the synthetic material core 1 fuse together. Any excess material is pressed out in the form of a wad 5 (FIG. 3) which is then sheared off by the edges of the separated cover sheet 2 which abut against each other when the bending operation is completed. The synthetic material wad 5 can then be easily pulled off. In an embodiment of the invention utilizing two cover sheet strips 2 as shown in the drawing, the second cover sheet strip on the opposite major surface of the core material 1 will remain uncut but will participate in the bending operation.

The bent plate is allowed to cool in the bending device.

Figure 4:
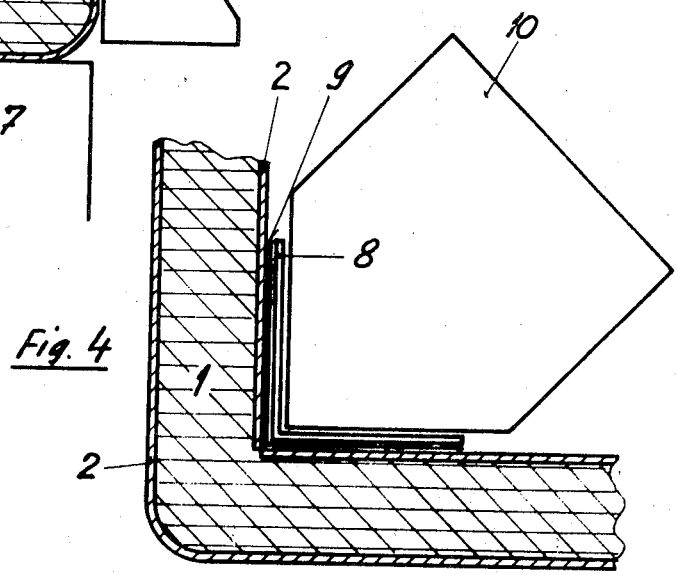
FIG. 4 is a fragmentary sectional view through a multi-layered composite plate according to a modified method of the present invention.

In accordance with the modification embodied in FIG. 4, the bent composite plate can be reinforced by cementing an angle piece 8, which is made of a suitable material such as for instance of aluminum or of an aluminum alloy to the exterior side of the cut strip portion 2. The angle piece 8 is cemented in place by an intermediary layer that may be a layer of cement or of a thin sheet of material 9 which has been treated with a bonding material. The angular strip is then pressed on to the cover strip by means of a heated stamping tool 10 to complete the emplacement.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a method of bending a composite plate that includes a core of a thermoplastic synthetic substance and a metal cover sheet disposed on at least one major surface of said core,
    the steps comprising,
        removing a strip of said cover sheet in the region of subsequent bending thereby creating a gap between the remaining portions of said sheet exposing said core at said gap,
        heating a portion of said core at said gap until a plasticized groove in said core is created thereby, and
        subsequently bending said composite plate about said groove until portions of the opposite faces of the groove abut and fuse.

2. In a method, as claimed in claim 1, and imparting to said groove a substantially V-shaped cross section.

3. In a method, as claimed in claim 1, said heating being carried out by inserting into said core a heating sword.

4. In a method, as claimed in claim 1, and computing prior to bending the width of said cover strip to be removed so that the edges of said sheet portions along said gap will meet each other during the bending of the plate.

5. In a method, as claimed in claim 1, and after the bending cementing to the exterior of said sheet portions an angle piece for reinforcement.

6. In a method, as claimed in claim 1, and dimensioning said strip and said groove removed so that said plate subsequent to bending will describe an angle of substantially 90° and the ends of said sheet portions will make contact thereby eliminating said gap.

7. In a method, as claimed in claim 1, and selecting the thickness of said core to be a multiple of the thickness of said sheet.

8. In a method, as claimed in claim 1, said composite plate including a second cover sheet on the opposite major surface of the core material, the step of retaining said second cover sheet uncut though participating in the bending of said plate.

9. In a method of bending a composite plate that includes a core of a thermoplastic substance, a first metal cover sheet disposed on one major surface of said core, a second metal cover sheet disposed on the opposite major surface of said core, the thickness of said core being a multiple of the thickness of said sheet,
    the steps comprising,
        removing a strip of one of said cover sheets in the region of subsequent inward bending thereby creating a gap between the remaining portions of said one cover sheet exposing said core at said gap,
        creating a groove by inserting a heating sword through said gap displacing at least some of said core material and forcing the displaced material to be deposited on said cover sheet portions, and
        subsequently bending said composite plate about said groove until pasticized portions of the opposite faces of the groove abut and fuse.

10. In a method, as claimed in claim 9, the edges of the remaining cover sheet portions along said gap shearing, during the bending, core material that may protrude beyond said sheet portions.

11. In a method, as claimed in claim 10, and utilizing a wedge shaped sword to create and to impart a V-shape to said groove.

References Cited

UNITED STATES PATENTS

| | | | |
|---|---|---|---|
| 2,246,660 | 6/1941 | Bawtenheimer | 156—211 |
| 3,456,701 | 7/1969 | Cornell | 156—211 X |
| 2,618,381 | 11/1952 | Gilbert | 156—211 X |
| 2,186,530 | 1/1940 | Jones | 156—211 X |

BENJAMIN A. BORCHELT, Primary Examiner

G. E. MONTONE, Assistant Examiner